(12) United States Patent
Oshima et al.

(10) Patent No.: US 12,462,979 B2
(45) Date of Patent: Nov. 4, 2025

(54) MULTILAYER CERAMIC CAPACITOR

(71) Applicant: Murata Manufacturing Co., Ltd., Nagaokakyo (JP)

(72) Inventors: Yuta Oshima, Nagaokakyo (JP); Shinya Isota, Nagaokakyo (JP); Sho Watanabe, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 89 days.

(21) Appl. No.: 18/438,836

(22) Filed: Feb. 12, 2024

(65) Prior Publication Data

US 2024/0186068 A1 Jun. 6, 2024

Related U.S. Application Data

(63) Continuation of application No. PCT/JP2022/035979, filed on Sep. 27, 2022.

(30) Foreign Application Priority Data

Sep. 30, 2021 (JP) .................. 2021-161111

(51) Int. Cl.
*H01G 4/12* (2006.01)
*H01G 4/012* (2006.01)
(Continued)

(52) U.S. Cl.
CPC ........... *H01G 4/1227* (2013.01); *H01G 4/012* (2013.01); *H01G 4/30* (2013.01); *H01G 4/2325* (2013.01)

(58) Field of Classification Search
CPC ........ H01G 4/1227; H01G 4/012; H01G 4/30; H01G 4/2325
See application file for complete search history.

(56) References Cited

U.S. PATENT DOCUMENTS 6,292,354 B1 9/2001 Kobayashi et al.
9,837,210 B2 * 12/2017 Doi ..................... H01G 4/30
(Continued)

FOREIGN PATENT DOCUMENTS

JP 2001015374 A 1/2001
JP 2001230150 A 8/2001
(Continued)

OTHER PUBLICATIONS

International Search Report in PCT/JP2022/035979, mailed Dec. 20, 2022, 3 pages.
(Continued)

*Primary Examiner* — Michael P McFadden
(74) *Attorney, Agent, or Firm* — Keating & Bennett, LLP

(57) ABSTRACT

A multilayer ceramic capacitor includes an element body portion and a pair of outer electrodes on first and second end surfaces and connected to inner electrode layers. The element body portion includes first and second side margin portions, and first and second outer layer portions, and an inner layer portion. A dielectric includes dielectric particles including barium and titanium, and, as sub-components, rare earth elements, and one or more first additional elements. In a cross section crossing a center in a length direction, dielectric layers included in an inner layer portion include core-shell particles and uniform solid solution particles. A ratio of average areas occupied by the core-shell particles and the uniform solid solution particles is about 0.8 to about 1.5, and a coefficient of variation of a first additional element concentration in the uniform solid solution particles is equal to or less than about 20%.

20 Claims, 7 Drawing Sheets

(51) Int. Cl.
*H01G 4/232* (2006.01)
*H01G 4/30* (2006.01)

(56) References Cited

U.S. PATENT DOCUMENTS

| | | | |
|---|---|---|---|
| 10,475,577 B2* | 11/2019 | Hirose | H01G 4/1218 |
| 10,497,512 B2* | 12/2019 | Tauchi | H01G 4/30 |
| 2001/0055193 A1 | 12/2001 | Chazono et al. | |
| 2002/0016249 A1 | 2/2002 | Saito et al. | |
| 2010/0067171 A1 | 3/2010 | Yamazaki et al. | |
| 2010/0110608 A1* | 5/2010 | Wei | C04B 35/4682 |
| | | | 361/321.4 |
| 2011/0222205 A1 | 9/2011 | Muraki et al. | |
| 2019/0035560 A1* | 1/2019 | Umetsu | H01G 11/50 |
| 2021/0210288 A1 | 7/2021 | Kang et al. | |
| 2022/0157528 A1* | 5/2022 | Cho | H01G 4/012 |

FOREIGN PATENT DOCUMENTS

| | | | |
|---|---|---|---|
| JP | 2002080276 A | 3/2002 | |
| JP | 2011184279 A | 9/2011 | |
| KR | 20090060454 A | 6/2009 | |
| KR | 20210088190 A | 7/2021 | |

OTHER PUBLICATIONS

Written Opinion in PCT/JP2022/035979, mailed Dec. 20, 2022, 3 pages.

\* cited by examiner

30

MULTILAYER CERAMIC CAPACITOR

CROSS REFERENCE TO RELATED APPLICATIONS

This application claims the benefit of priority to Japanese Patent Application No. 2021-161111 filed on Sep. 30, 2021 and is a Continuation Application of PCT Application No. PCT/JP2022/035979 filed on Sep. 27, 2022. The entire contents of each application are hereby incorporated herein by reference.

BACKGROUND OF THE INVENTION

1. Field of the Invention

The present invention relates to multilayer ceramic capacitors.

2. Description of the Related Art

Along with reduction in size of electronic devices such as mobile phones and an increase in speed of CPUs, a demand for multilayer ceramic capacitors (MLCC) has been increasing. A multilayer ceramic capacitor has a structure in which dielectric layers and inner electrode layers are alternately laminated, and has a large electrostatic capacitance despite a small size thereof due to the dielectric layers being thinned and having a high dielectric constant. Although multilayer ceramic capacitors in which various materials are used are known, those in which a barium titanate ($BaTiO_3$) based compound is used for dielectric layers, and a non-precious metal such as nickel (Ni) is used for inner electrode layers are widely used because they are inexpensive and have high characteristics.

In order to achieve a reduction in size and an increase in capacitance of a multilayer ceramic capacitor, it is effective to increase a dielectric constant of a dielectric layer, and to promote thinning and multilayering of the dielectric layer. However, as the dielectric layer becomes thinner, the strength of an electric field applied per layer increases and an influence of fine defects in the dielectric layer increases. Thus, there is a possibility that a reduction in insulation resistance (IR) or an insulation breakdown occurs, which may reduce reliability. When the insulation resistance is insufficient, a leakage current is generated, and dielectric loss increases. Further, when the reduction in insulation resistance or an insulation breakdown occurs during actual operation, a problem of a shortened lifetime occurs. Thus, along with promoting thinning of a dielectric layer, it is important to ensure reliability of a multilayer ceramic capacitor.

In order to increase the reliability of a multilayer ceramic capacitor, it has been proposed to provide a dielectric particle, included in a dielectric layer, with a core-shell structure. The core-shell particle is made of a core portion and a shell portion provided on a surface of the core portion. Sub-components such as rare earth elements are dissolved with high concentration in the shell portion, whereas sub-components are dissolved with low concentration in the core portion. By providing the particle with such a structure, the problem of a shortened lifetime is suppressed and reliability is improved.

For example, Japanese Unexamined Patent Application Publication No. 2001-230150 discloses a ceramic capacitor including a plurality of dielectric layers and a plurality of inner electrodes integrally laminated, in which the dielectric layer includes a sintered body of ceramic particles, the ceramic particle is made of a crystalline core portion and a shell portion surrounding the core portion, and the core portion includes an additive element with a concentration gradient (Claim 1 of Japanese Unexamined Patent Application Publication No. 2001-230150). Further, Japanese Unexamined Patent Application Publication No. 2001-230150 describes that concentration of the additive element increases from a center of the core portion toward the shell portion, the shell portion includes Mg and rare earth elements such as Ho, and when the dielectric layer is thinned, life characteristics are improved, thinning and multilayering are enabled, and thus the multilayer ceramic capacitor can be reduced in size and increased in capacitance (Claims 2 and 6 and paragraph [0033] of Japanese Unexamined Patent Application Publication No. 2001-230150).

As described above, in the related art, it has been proposed to provide a dielectric particle included in a dielectric layer with a core-shell structure, to achieve improvement in reliability of a multilayer ceramic capacitor. However, in recent years, demands for a reduction in size and an increase in capacitance of a multilayer ceramic capacitor have been increasing, and existing techniques are insufficient to meet these demands. Thus, expectations for a ceramic capacitor that has a high dielectric constant, can be reduced in size and increased in capacitance, and has excellent reliability have been increasing.

SUMMARY OF THE INVENTION

The inventors of example embodiments of the present invention have conducted intensive studies in view of such existing problems. As a result, the inventors of example embodiments of the present invention focused on a specific element included in dielectric particles in a dielectric layer, and obtained knowledge that by controlling an intra-particle concentration distribution and inter-particle variations of the element, a dielectric constant ($\varepsilon$) and insulation resistance (IR) are increased and a lifetime can be increased, and as a result, multilayer ceramic capacitors each capable of being reduced in size, having increased capacitance, and having excellent reliability are able to be obtained.

Example embodiments of the present invention provide multilayer ceramic capacitors that are each able to be reduced in size and increased in capacitance, and have excellent reliability.

In the present specification, an expression "to" includes numerical values at both ends. That is, "X to Y" is synonymous with "equal to or more than X and equal to or less than Y".

According to an example embodiment of the present invention, a multilayer ceramic capacitor includes an element body portion including a first main surface and a second main surface opposite to each other in a thickness direction, a first side surface and a second side surface opposite to each other in a width direction, and a first end surface and a second end surface opposite to each other in a length direction, the element body portion including a plurality of dielectric layers and a plurality of inner electrode layers alternately laminated in the thickness direction, and a pair of outer electrodes provided on the first end surface and the second end surface and connected to the plurality of inner electrode layers, wherein the element body portion includes a first side margin portion extending along the first side surface, made of a dielectric, and that does not include the inner electrode layers, a second side margin portion extending along the second side surface, made of the dielectric, and that does not include the inner electrode layers, a first outer layer portion made of the dielectric, sandwiched between the first side margin portion and the second side margin portion, and sandwiched between the first main surface and an inner electrode layer closest to the first main surface among the plurality of inner electrode layers, a second outer layer portion made of the dielectric, sandwiched between the first side margin portion and the second side margin portion, and sandwiched between the second main surface and an inner electrode layer closest to the second main surface among the plurality of inner electrode layers, and an inner layer portion sandwiched between the first side margin portion and the second side margin portion, sandwiched between the first outer layer portion and the second outer layer portion, and defined by a multilayer body including the plurality of dielectric layers and the plurality of inner electrode layers, the dielectric of the first side margin portion, the second side margin portion, the first outer layer portion, and the second outer layer portion, and the dielectric layers included in the inner layer portion each include dielectric particles including barium (Ba) and titanium (Ti), and further including, as sub-components, rare earth elements (Re), and one or more first additional elements (Me) selected from manganese (Mn), vanadium (V), iron (Fe), copper (Cu), cobalt (Co), nickel (Ni), or chromium (Cr), and in a cross section crossing a center in the length direction of the multilayer ceramic capacitor, the dielectric layers included in the inner layer portion include, as the dielectric particles, both core-shell particles and uniform solid solution particles, a ratio (A/B) of an average area (A) occupied by the core-shell particles to an average area (B) occupied by the uniform solid solution particles is equal to or more than about 0.8 and equal to or less than about 1.5, and a coefficient of variation representing inter-particle variations of first additional element concentration included in the uniform solid solution particles is equal to or less than about 20%.

According to example embodiments of the present invention, multilayer ceramic capacitors that are each able to be reduced in size and increased in capacitance and have excellent reliability are provided.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Example embodiments of the present invention will be described with reference to the drawings. The present invention is not limited to the example embodiments, and various modifications can be made without departing from the scope of the present invention.

1. Multilayer Ceramic Capacitor

Figure 1:
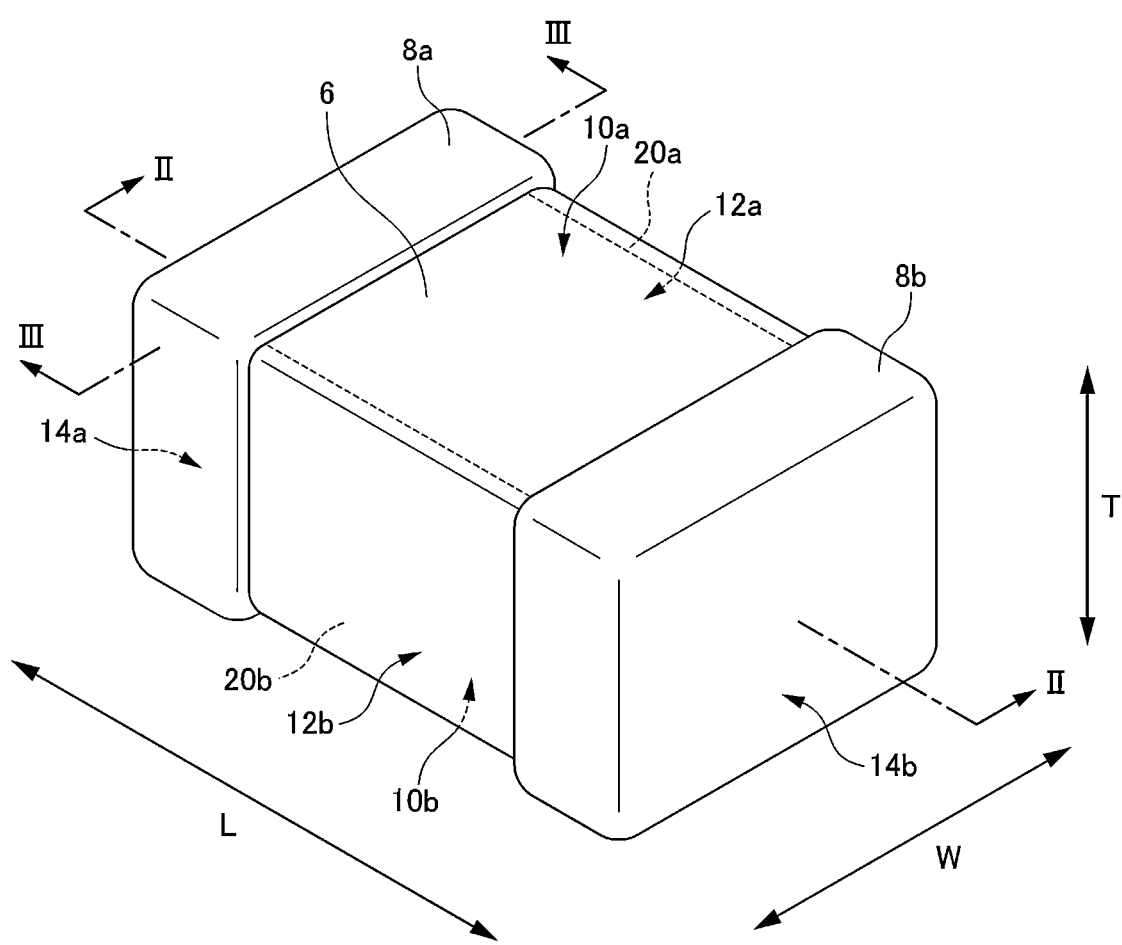
FIG. 1 is a perspective view illustrating an outer shape of a multilayer ceramic capacitor according to an example embodiment of the present invention.
Figure 2:
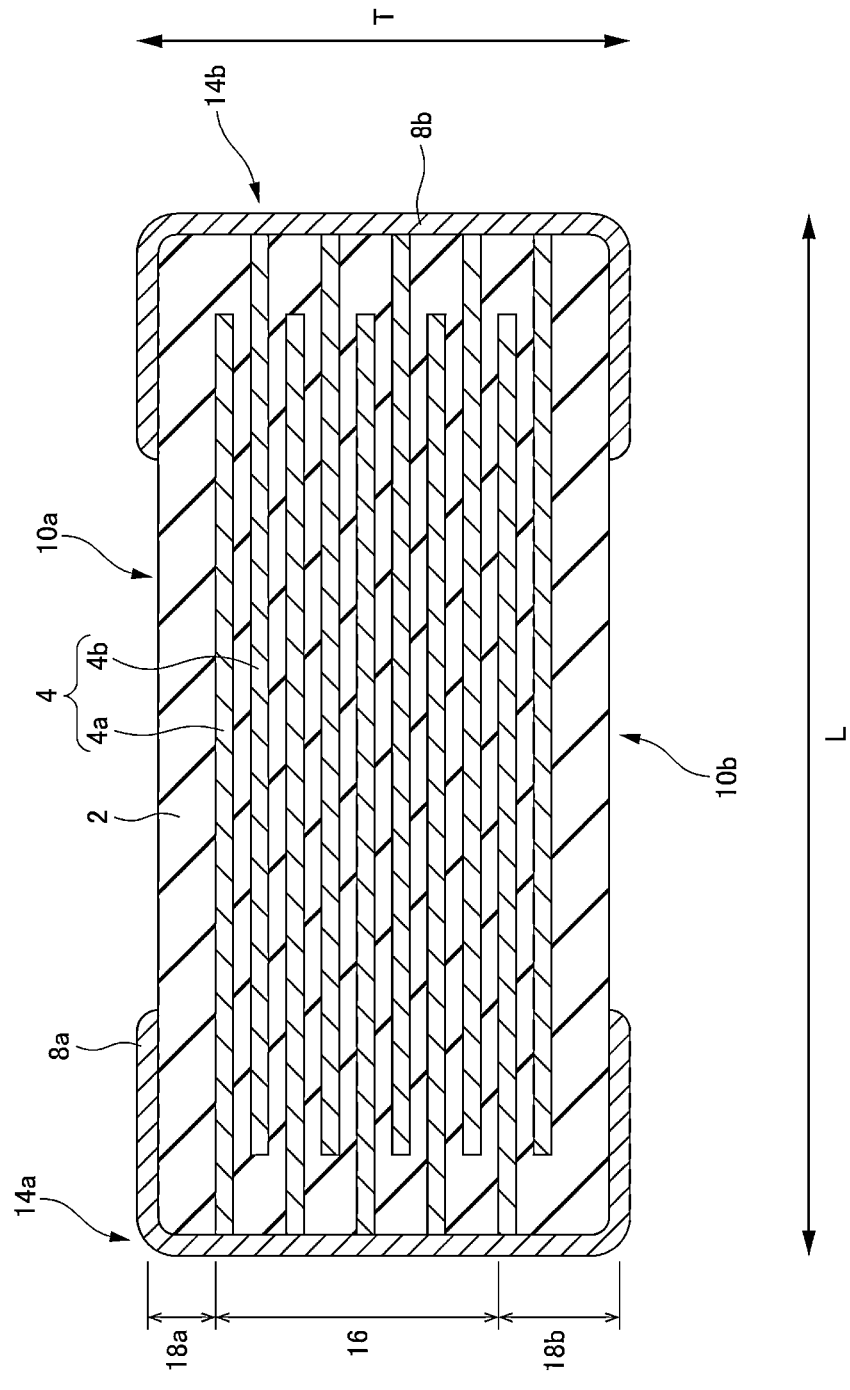
FIG. 2 is a schematic diagram of a cross section illustrating an internal structure of a multilayer ceramic capacitor according to an example embodiment of the present invention.
Figure 3:
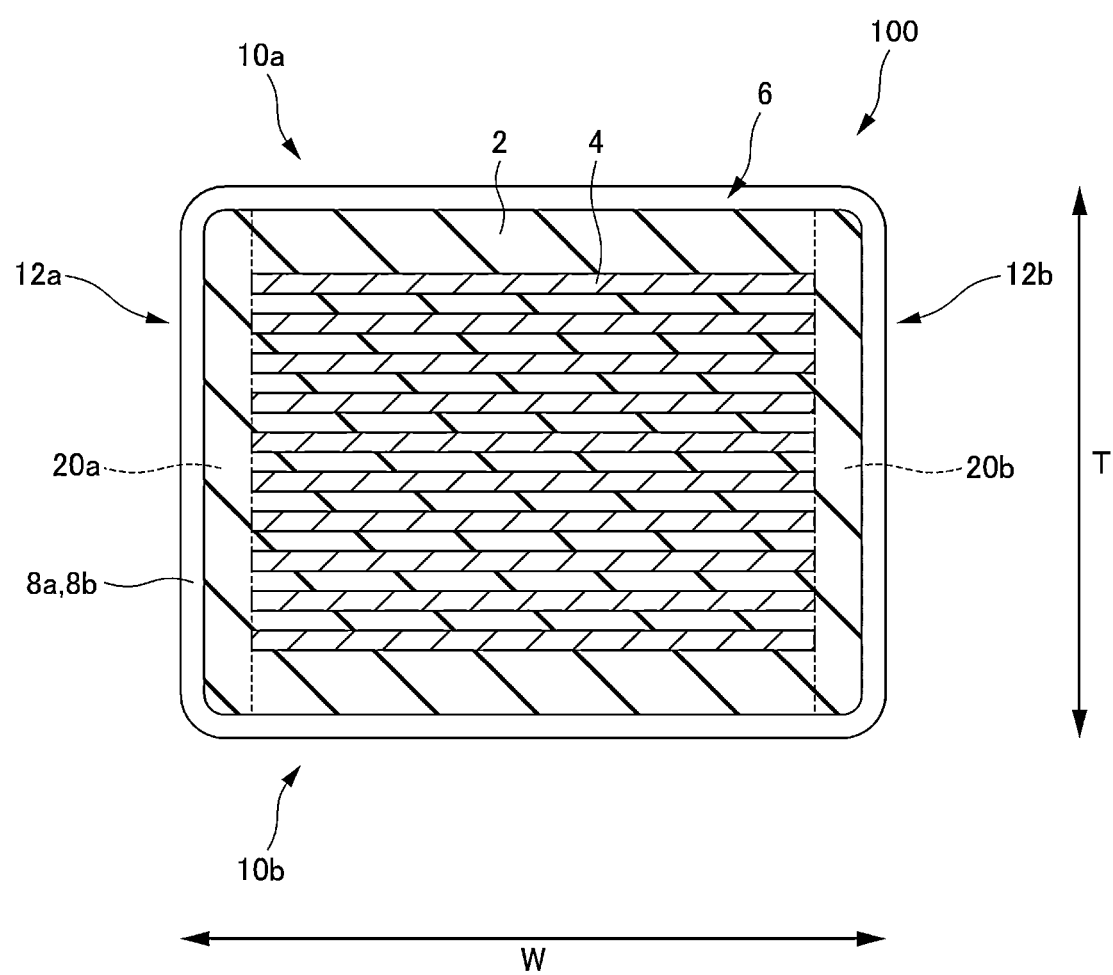
FIG. 3 is a schematic diagram of a cross section illustrating an internal structure of a multilayer ceramic capacitor according to an example embodiment of the present invention.

A multilayer ceramic capacitor of an example embodiment of the present invention will be described using FIG. 1 to FIG. 3. FIG. 1 is a perspective view illustrating an outer shape of the multilayer ceramic capacitor. FIG. 2 is a sectional view of the multilayer ceramic capacitor illustrated in FIG. 1 taken along line II-II, and FIG. 3 is a sectional view of the multilayer ceramic capacitor illustrated in FIG. 1 taken along line III-III.

A multilayer ceramic capacitor (22) includes an element body portion (6) including a plurality of alternately laminated dielectric layers (2) and inner electrode layers (4), and a pair of outer electrodes (8a, 8b) provided on both end surfaces (14a, 14b) of the element body portion (6). The multilayer ceramic capacitor (22) and the element body portion (6) each have a rectangular or substantially rectangular parallelepiped shape. The rectangular or substantially rectangular parallelepiped includes not only a rectangular parallelepiped, but also a rectangular parallelepiped having rounded corner portions and/or ridge portions. Here, the corner portion is a portion where three surfaces of the element body portion (6) intersect, and the ridge portion is a portion where two surfaces of the element body portion (6) intersect. Preferably, the multilayer ceramic capacitor (22) and the element body portion (6) each have a rectangular or substantially rectangular parallelepiped shape with rounded corner portions and/or ridge portions.

The multilayer ceramic capacitor (22) and the element body portion (6) include a first main surface (10a) and a second main surface (10b) opposite to each other in a thickness direction T, a first side surface (12a) and a second side surface (12b) opposite to each other in a width direction W, and a first end surface (14a) and a second end surface (14b) opposite to each other in a length direction L. Here, the thickness direction T refers to a direction in which the dielectric layers (2) and the inner electrode layers (4) are laminated. It can also be said that the thickness direction T is a direction orthogonal or substantially orthogonal to layer surfaces of the dielectric layers (2) and the inner electrode layers (4). The length direction L refers to a direction that is orthogonal or substantially orthogonal to the thickness direction T, and in which the end surfaces (14a, 14b) are opposite to each other. That is, the direction is a direction that is orthogonal or substantially orthogonal to the end surfaces (14a, 14b), and in which the end surfaces (14a, 14b) are linked. The width direction W is a direction orthogonal or substantially orthogonal to the thickness direction T and the length direction L. A plane including the thickness direction T and the width direction W is defined as a WT plane, a plane including the width direction W and the length direction L is defined as an LW plane, and a plane including the length direction L and the thickness direction T is defined as an LT plane.

The outer electrodes (8a, 8b) include a first outer electrode (8a) provided on the first end surface (14a) and a second outer electrode (8b) provided on the second end surface (14b), respectively. The first outer electrode (8a) may wrap around a portion of the first main surface (10a), the second main surface (10b), the first side surface (12a) and the second side surface (12b), in addition to the first end surface (14a). Further, the second outer electrode (8b) may wrap around a portion of the first main surface (10a), the second main surface (10b), the first side surface (12a) and the second side surface (12b), in addition to the second end surface (14b). However, the first outer electrode (8a) and the second outer electrode (8b) are not in contact with each other, and are electrically separated from each other.

The inner electrode layers (4) include a plurality of first inner electrode layers (4a) and a plurality of second inner electrode layers (4b). The first inner electrode layer (4a) includes rectangular or substantially rectangular opposing electrode portions facing each other, and an extended electrode portion extending to the end surface (14a) and connected to the outer electrode (8a), and the second inner electrode layer (4b) includes rectangular or substantially rectangular opposing electrode portions facing each other, and an extended electrode portion extending to the end surface (14b) and connected to the outer electrode (8b). That is, the plurality of first inner electrode layers (4a) extend to the first end surface (14a) with the extended electrode portions interposed therebetween, and is electrically connected to the first outer electrode (8a). Further, the plurality of second inner electrode layers (4b) extend to the second end surface (14b) with the extended electrode portions interposed therebetween, and is electrically connected to the second outer electrode (8b). The first inner electrode layer (4a) and the second inner electrode layer (4b) are alternately laminated so as to be opposed to each other with the dielectric layer (2) interposed therebetween in the thickness direction T. The first inner electrode layer (4a) and the second inner electrode layer (4b) opposed to each other with the dielectric layer 2 interposed therebetween are not electrically connected to each other. Thus, when a voltage is applied via the outer electrodes (8a, 8b) and the extended electrode portions, a charge is accumulated between the opposing electrode portion of the first inner electrode layer (4a) and the opposing electrode portion of the second inner electrode layer (4b). The accumulated charge generates electrostatic capacitance, and thus defines and functions as a capacitance element (capacitor).

Figure 4:
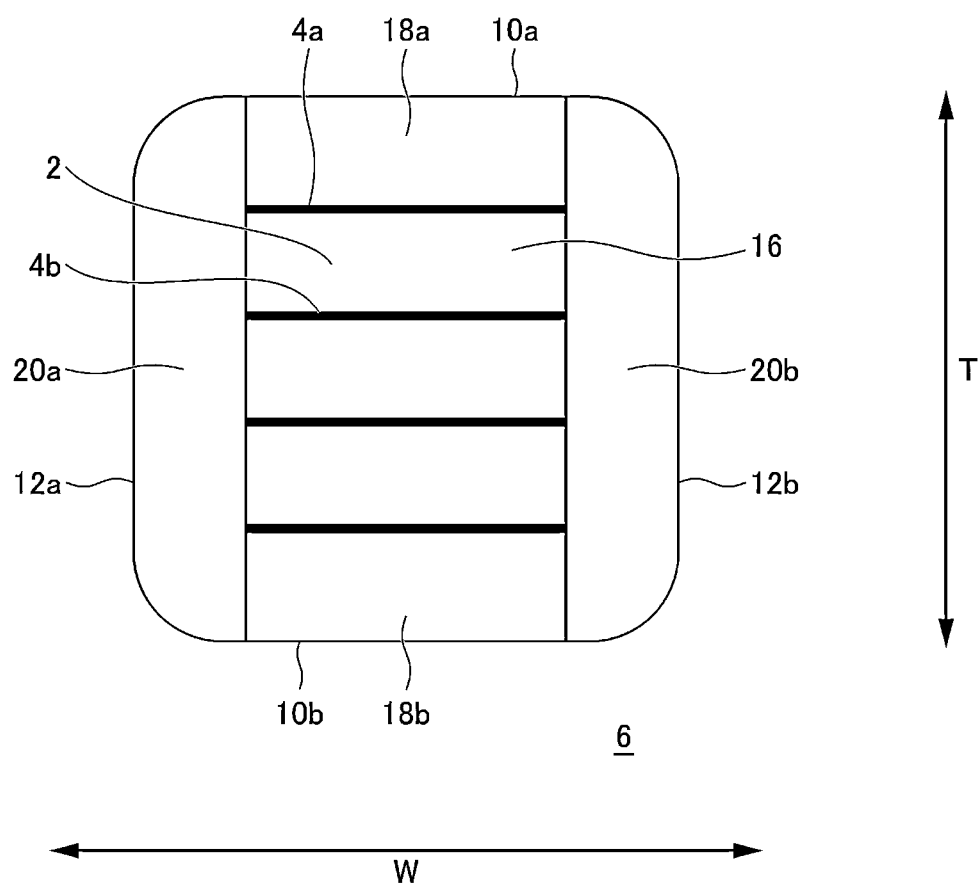
FIG. 4 is a schematic diagram of a cross section illustrating an internal structure of an element body portion according to an example embodiment of the present invention.

FIG. 4 illustrates a schematic diagram of a cross section (WT plane) of the element body portion (6). The element body portion (6) includes an inner layer portion (16), a first outer layer portion (18a), a second outer layer portion (18b), a first side margin portion (20a) and a second side margin portion (20b). The first side margin portion (20a) is made of a dielectric that extends along the first side surface (12a) and does not include the inner electrode layers (4a, 4b). The second side margin portion (20b) is made of a dielectric that extends along the second side surface (12b) and does not include the inner electrode layers (4a, 4b). In other words, the first side margin portion (20a) is a region sandwiched between an end portion close to the first side surface (12a) of the inner electrode layer (4a, 4b) and the first side surface (12a), and the second side margin portion (20b) is a region sandwiched between an end portion close to the second side surface (12b) of the inner electrode layer (4a, 4b) and the second side surface (12b).

The first outer layer portion (18a) is made of a dielectric sandwiched between the first side margin portion (20a) and the second side margin portion (20b), and sandwiched between the first main surface (10a) and an inner electrode layer of the plurality of inner electrode layers (4a, 4b), which is closest to the first main surface (10a). The second outer layer portion (18b) is made of a dielectric sandwiched between the first side margin portion (20a) and the second side margin portion (20b), and sandwiched between the second main surface (10b) and an inner electrode layer of the plurality of inner electrode layers (4a, 4b), which is closest to the second main surface (10b). The inner layer portion (16) is sandwiched between the first side margin portion (20a) and the second side margin portion (20b), sandwiched between the first outer layer portion (18a) and the second outer layer portion (18b), and includes a multilayer body including the dielectric layers (2) and the inner electrode layers (4a, 4b). It can be said that the inner layer portion (16) is a region sandwiched between the inner electrode layer closest to the first main surface (10a) and the inner electrode layer closest to the second main surface (10b). The inner layer portion (16) defines and functions as a capacitance element. In short, it can be said that the inner layer portion (16) including the multilayer body of the dielectric layers (2) and the inner electrode layers (4a, 4b) is sandwiched between the first outer layer portion (18a) and the second outer layer portion (18b) in a lamination direction (thickness direction), and an entirety or substantially an entirety thereof is sandwiched between the first side margin portion (20a) and the second side margin portion (20b) in the width direction.

Sizes of the multilayer ceramic capacitor (22) and the element body portion (6) are not particularly limited. For example, a dimension in the length direction L is equal to or more than about 0.2 mm and equal to or less than about 3.2 mm, a dimension in the width direction W is equal to or more than about 0.1 mm and equal to or less than about 2.5 mm, and a dimension in the lamination direction T is equal to or more than about 0.1 mm and equal to or less than about 2.5 mm. Although FIG. 1 and FIG. 2 illustrate that a dimension in the length direction L is larger than a dimension in the width direction W, the multilayer ceramic capacitor of the present example embodiment is not limited to one having such dimensions. A dimension in the length direction L may be smaller than a dimension in the width direction W.

Inner Layer Portion-Dielectric Layer

The dielectric layer defines the inner layer portion of the multilayer ceramic capacitor together with the inner electrode layer. The dielectric layer includes dielectric particles (dielectric grains). That is, the dielectric layer is a sintered polycrystalline body (ceramics) in which a large number of dielectric particles are bonded to each other via grain boundaries and triple points. The dielectric particles are made of a perovskite oxide and define a main component of the dielectric layer. It can be said that the dielectric layer is dielectric ceramics including a perovskite oxide as a main component. A perovskite oxide has a composition represented by a general expression: $ABO_3$, and has a cubic crystal crystalline structure such as cubic, tetragonal, orthorhombic or rhombohedral at room temperature. In addition, atoms of an A-site element (hereinafter, referred to as "A-site atoms") and atoms of a B-site element (hereinafter, referred to as "B-site atoms") are ionized and occupy an A-site and a B-site of a perovskite structure, respectively. The main component is a component having the highest content ratio in the dielectric layer. For example, the content ratio of the dielectric particles (perovskite oxide) as the main component in the dielectric layer may be equal to or more than about 50 mass %, may be equal to or more than about 60 mass %, may be equal to or more than about 70 mass %, may be equal to or more than about 80 mass % or may be equal to or more than about 90 mass %.

The dielectric particles include barium (Ba) and titanium (Ti). That is, the perovskite oxide of the dielectric particles is a barium titanate ($BaTiO_3$) based compound. $BaTiO_3$ has a large spontaneous polarization at room temperature, thus is a ferroelectric substance that has a high dielectric constant. By using the $BaTiO_3$ based compound as the main component, the capacitor can further be increased in capacitance. The $BaTiO_3$ based compound includes not only $BaTiO_3$ but also compounds in which Ba in $BaTiO_3$ is partially replaced with other A-site elements such as Sr and/or Ca, or compounds in which Ti is partially replaced with other B-site elements such as, for example, Zr and/or Hf. However, for example, a ratio of Ba in the A-site element is preferably equal to or more than about 70%, more preferably equal to or more than about 80%, and still more preferably equal to or more than about 90% in terms of molar ratio. Further, for example, a ratio of Ti in the B-site element is preferably equal to or more than about 70%, more preferably equal to or more than about 80%, and still more preferably equal to or more than about 90% in terms of molar ratio.

The dielectric layer includes rare earth elements (Re) as sub-components. The "rare earth element (Re)" is a generic term for elements in the group of scandium (Sc) having an atomic number of 21, yttrium (Y) having an atomic number of 39, and lanthanum (La) having an atomic number of 57 to lutetium (Lu) having an atomic number of 71 in the periodic table. The rare earth elements (Re) are, for example, preferably one or more elements selected from lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb) and lutetium (Lu), and particularly preferably includes dysprosium (Dy).

The rare earth elements (Re) have an advantageous effect of improving a lifetime of the dielectric layer and enabling improvement of reliability. In $BaTiO_3$, Ba ions ($Ba^{2+}$) having a large ion radius occupy an A-site, and Ti ions ($Ti^{4+}$) having a small ion radius occupy a B-site. The rare earth elements (Re) usually become positive trivalent ions ($Re^{3+}$), and an ion radius thereof is about intermediate between $Ba^{2+}$ and $Ti^{4+}$. Thus, the rare earth elements are dissolved in $BaTiO_3$ and replace one or both of Ba and Ti. The rare earth elements occupying a Ba site (A-site) work as donors, and the rare earth elements occupying a Ti site (B-site) work as acceptors.

$BaTiO_3$ based dielectric ceramics include a large number of oxygen vacancies generated in a firing step in dielectric particles. In particular, in manufacturing of the multilayer ceramic capacitor, the firing is performed in a weakly reducing atmosphere in order to reduce or prevent oxidation of the inner electrode layer. Thus, $BaTiO_3$ is reduced, and the oxygen vacancies are easily generated. The oxygen vacancies have a positive charge, and the oxygen vacancies provide paths of the charge. When an amount of the oxygen vacancies is large, an amount of charge that moves increases, and deterioration of insulation resistance is likely to occur, and in particular, the oxygen vacancies are likely to move to a vicinity of a negative electrode in a high temperature environment. Thus, when a load is applied, an amount of oxygen vacancies close to the negative electrode is locally increased, and insulation resistance is deteriorated. On the other hand, addition of the rare earth elements to $BaTiO_3$, which act as the donors and/or acceptors, reduces or prevents the generation and movement of the oxygen vacancies. Thus, the deterioration of insulation resistance, and an insulation breakdown are reduced or prevented, and as a result, a high temperature load life is increased.

The dielectric layer further includes first additional elements (Me) as sub-components. The first additional elements (Me) are, for example, one or more elements selected from manganese (Mn), vanadium (V), iron (Fe), copper (Cu), cobalt (Co), nickel (Ni) and chromium (Cr), and preferably include nickel (Ni).

The first additional elements (Me) have an advantageous effect of increasing insulation resistance (IR) of the dielectric layer. As described above, since the firing is performed in a weakly reducing atmosphere during the manufacturing of the multilayer ceramic capacitor, $BaTiO_3$ included in the dielectric layer is easily reduced. When reduced, $BaTiO_3$ becomes semiconductive and insulation resistance thereof decreases. The low insulation resistance makes a leakage current that causes an increase in dielectric loss more likely to flow, and easily leads to life deterioration. The first additional elements (Me) are acceptor elements that are dissolved mainly in the Ti site of $BaTiO_3$, and have an advantageous effect of improving reduction resistance. Thus, by adding the first additional elements, the insulation resistance of the dielectric layer after the firing is increased, and as a result, the leakage current is reduced or prevented, and the high temperature load life is increased.

Each of the rare earth elements (Re) and the first additional elements (Me) may be an element of only one type, or may be a combination of a plurality of types of elements. Additionally, it is sufficient that at least a portion of the rare earth elements and the first additional elements is included in the dielectric particles. An element not included in the dielectric particles can be present at the grain boundaries or the triple points.

The dielectric layer may include sub-components other than the rare earth elements (Re) and the first additional elements (Me). Examples of such sub-components include, but are not limited to, silicon (Si), magnesium (Mg), aluminum (Al), and/or compounds thereof. These sub-components may be included in the dielectric particles or may be present at the grain boundaries or triple points.

In the multilayer ceramic capacitor of the present example embodiment, in a cross section crossing a center in the length direction, the dielectric layer included in the inner layer portion includes both core-shell particles and uniform solid solution particles as the dielectric particles. That is, the dielectric layer of the inner layer portion includes the core-shell particles and the uniform solid solution particles in a mixed state. Since both of the core-shell particles and the uniform solid solution particles are included at predetermined ratios, a dielectric constant and the insulation resistance of the dielectric layer are increased, and reliability is markedly improved. The reason for this will be described below.

Figure 5:
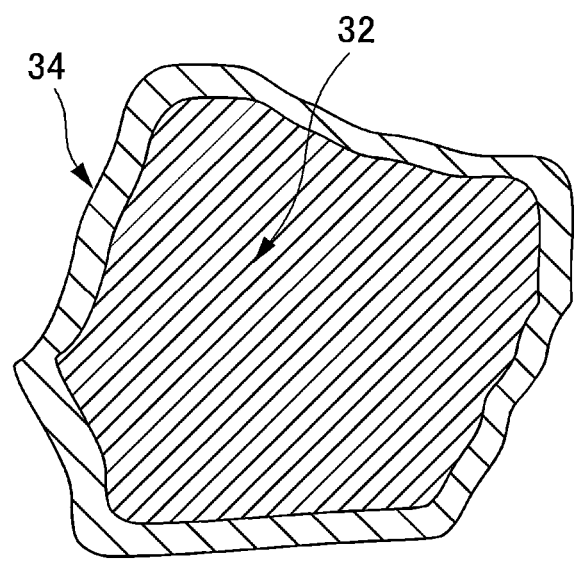
FIG. 5 is a schematic diagram of a cross section illustrating an internal structure of a core-shell particle according to an example embodiment of the present invention.

FIG. 5 illustrates a schematic diagram of a cross section of the core-shell particle. The core-shell particle (30) is a particle of the rare earth elements or the like including a core portion (32) having a low concentration of sub-components, and a shell portion (34) having a high concentration of sub-components provided on a surface of the core portion. In particular, the core-shell particle (30) is a dielectric particle in which a molar ratio of the rare earth elements (Re) to titanium (Ti) at a portion inward from an outer surface of the particle by about 10 nm (outer peripheral portion of the particle) is, for example, equal to or more than about 1.5 times a molar ratio of the rare earth elements (Re) to titanium (Ti) at a central portion of the particle. It can be also said that the core-shell particle (30) is a particle with a Re concentration distribution ratio of equal to or more than about 1.5. Here, the Re concentration distribution ratio is a ratio ((shell Re/Ti ratio)/(core Re/Ti ratio)) of a molar ratio of the rare earth elements (Re) to titanium (Ti) at the outer peripheral portion of the particle (shell Re/Ti ratio) and a molar ratio of the rare earth elements (Re) to titanium (Ti) at the central portion of the particle (core Re/Ti ratio).

By providing the dielectric particle with a core-shell structure, the high temperature load life is significantly improved. This is because the movement of oxygen vacancies which causes insulation deterioration is reduced or prevented by dissolving the sub-components such as the rare earth elements which define and function as donors or acceptors in the shell portion.

A concentration distribution of the first additional elements (Me) in the core-shell particle is not particularly limited. Further, an average particle size of the core-shell particles is, for example, preferably equal to or more than about 100 nm and less than about 150 nm. The average particle size can be determined by measuring cross-sectional areas of a plurality of particles in a field of view of about 1000 nm×about 1000 nm, as an average value of circle equivalent diameters of the areas.

The uniform solid solution particle is a particle in which sub-components are uniformly dissolved in the particle, or a particle in which no sub-component is dissolved. In particular, the uniform solid solution particle is a dielectric particle in which a molar ratio of the rare earth elements (Re) to titanium (Ti) at a portion inward from an outer surface of the particle by about 10 nm (outer peripheral portion) is, for example, less than about 1.5 times a molar ratio of the rare earth elements (Re) to titanium (Ti) at a central portion of the particle. It can be also said that the uniform solid solution particle is a particle having a Re concentration distribution ratio ((shell Re/Ti ratio)/(core Re/Ti ratio)) of less than about 1.5.

The uniform solid solution particle is also called a non-core-shell particle. The dielectric constant can be further increased by uniformly dissolving the sub-components. That is, the core-shell particle has an advantage that reliability can be improved, but has a limit in increasing a dielectric constant itself. On the other hand, the dielectric constant can be increased by using the uniform solid solution particle. An average particle size of the uniform solid solution particles is, for example, preferably equal to or more than about 150 nm and equal to or less than about 400 nm.

In the multilayer ceramic capacitor of the present example embodiment, the dielectric layer includes the core-shell particles and the uniform solid solution particles at predetermined ratios. Specifically, in the dielectric layer included in the inner layer portion, a ratio (A/B) of an average area (A) occupied by the core-shell particles to an average area (B) occupied by the uniform solid solution particles is, for example, equal to or more than about 0.8 and equal to or less than about 1.5 in the cross section crossing the center in the length direction of the multilayer ceramic capacitor. By limiting A/B to fall within a predetermined range, the dielectric constant and insulation resistance of the dielectric layer are increased, and the reliability is increased. On the other hand, when A/B is less than about 0.8, the ratio of the uniform solid solution particles is too large, and thus there is a possibility that the reliability is deteriorated. In addition, when A/B is more than about 1.5, the ratio of the core-shell particles is too large, and thus there is a possibility that the dielectric constant is decreased. A/B is, for example, preferably equal to or more than about 0.8 and equal to or less than about 1.5, and more preferably equal to or more than about 1.0 and equal to or less than about 1.3.

Figure 6:
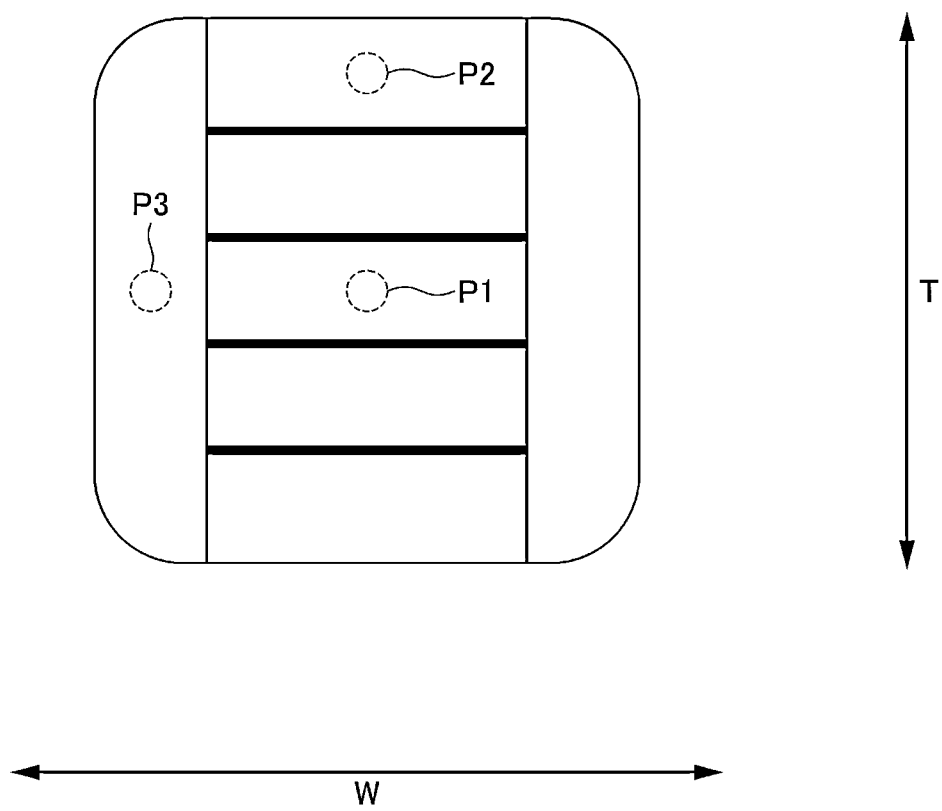
FIG. 6 is a drawing illustrating positions where samples for TEM observation are taken.

Next, examples of a method of discriminating the core-shell particles and the uniform solid solution particles, and a method of calculating A/B will be described. FIG. 6 is a schematic diagram of a cross section illustrating the cross section (WT plane) crossing the center in the length direction of the multilayer ceramic capacitor. First, the multilayer ceramic capacitor is processed to expose a plane (WT plane) that crosses the center in the length direction and includes the width direction and the thickness direction. Next, a thin sample piece having the WT plane as an observation plane is taken. The thin sample piece is taken from a position that is a center or approximate center in the width direction and a center or approximate center in the thickness direction of the inner layer portion, that is, from a portion of P1 illustrated in FIG. 6. However, when only an inner electrode layer is present at the center in the width direction and the center in the thickness direction of the inner layer portion, and the dielectric layer cannot be observed, a thin sample piece is taken from a dielectric layer adjacent to the inner electrode layer. Then, the thin sample piece is observed with a transmission electron microscope (TEM). The observation is performed for a field of view of about 1000 nm×about 1000 nm.

Then, for each of the dielectric particles in the dielectric layer included in the field of view, an elemental analysis using TEM-EDX is performed. The elemental analysis is performed on each of a central portion of each particle (particle center) and a portion inward from a particle outer surface by a distance of about 10 nm (particle outer peripheral portion). However, a particle having a shape distorted to such an extent that a central portion cannot be determined is excluded from the analysis, or the analysis is performed using a portion inward by a distance of about 20 nm. Then, a particle having a Re concentration distribution ratio of equal to or more than about 1.5 is determined as a core-shell particle, and a particle having a Re concentration distribution ratio of less than about 1.5 is determined as a uniform solid solution particle.

Next, an area occupied by each core-shell particle in the cross section is measured based on a TEM image. Then, the areas are added to obtain a total area of the core-shell particles, and the total area is divided by the number of the core-shell particles to calculate an average area (A). Similarly, an average area (B) is calculated by dividing a total area of the uniform solid solution particles by the number of uniform solid solution particles. Then, an area ratio (A/B) is obtained by dividing the average area (A) of the core-shell particles by the average area (B) of uniform solid solution particles.

As described above, in the multilayer ceramic capacitor of the present example embodiment, the area ratio (A/B) of the core-shell particles to the uniform solid solution particles is obtained at the center or approximate center in the width direction and the center or approximate center in the thickness direction of the inner layer portion. Further, the A/B ratio at this portion is limited to fall within a predetermined range. However, the ratio A/B is not limited to fall within the above range in all regions of the inner layer portion. In some cases, the ratio of the uniform solid solution particles is large in a region in the inner layer portion near an interface with the outer layer portion (the first outer layer portion, the second outer layer portion). For example, in a dielectric layer in the inner layer portion, that is closest to the outer layer portion, a ratio of the uniform solid solution particles may be large. In this case, the dielectric layer closest to the outer layer portion preferably has, for example, A/B equal to or more than about 0.8 and equal to or less than about 1.0.

In the multilayer ceramic capacitor of the present example embodiment, inter-particle variations in first additional element concentration of the uniform solid solution particles are small in a dielectric layer included in the inner layer portion. Specifically, in the dielectric layer included in the inner layer portion, a coefficient of variation of the first additional element concentration in the uniform solid solution particles is, for example, equal to or less than about 20% in the cross section crossing the center in the length direction of the multilayer ceramic capacitor. Here, the coefficient of variation is an index representing the inter-particle variations in the first additional element concentration, and is a ratio (variation value/average value) of a value of the inter-particle variation (standard deviation) to an average value. Reducing the variation in the first additional element concentration makes it possible to increase the insulation resistance (IR).

The first additional elements have an advantageous effect of improving insulating characteristics of dielectric ceramics and reducing or preventing occurrence of a leakage current. However, when the inter-particle variations in the first additional element concentration are large, a portion having a low concentration may be locally generated. In this case, the insulation resistance is reduced at a portion having a low concentration of the first additional element, and a leakage current flows. By reducing the inter-particle variations of the first additional element concentration, the occurrence of a leakage current is reduced or prevented, and the insulation characteristics are improved. The coefficient of variation of the first additional element concentration may be, for example, equal to or more than about 8% and equal to or less than about 20%, equal to or more than about 9% and equal to or less than about 18%, or equal to or more than about 10% and equal to or less than about 15%.

The coefficient of variation can be determined as follows. That is, in the above-described TEM observation, a cross-sectional image is captured in a field of view of about 1000 nm×about 1000 nm, and each side is divided into 255 parts, so that the field of view is divided into a plurality of cells in a matrix. Next, concentration of the first additional elements is measured for each dielectric particle in each cell and an average value and a variation value (standard deviation) are obtained. Then, the variation value/the average value is calculated as a coefficient of variation.

Inner Layer Portion-Inner Electrode Layer

The inner electrode layers (first inner electrode layer, second inner electrode layer) define the inner layer portion together with the dielectric layer. Further, the inner electrode layer includes the opposing electrode portions and the extended electrode portion, and the opposing electrode portions sandwich the dielectric layer to define and function as a capacitance element. The extended electrode portion electrically connects the opposing electrode portions and the outer electrode. The inner electrode layer includes a conductive metal. It is sufficient to use, as the conductive metal, known electrode materials such as, for example, nickel (Ni), copper (Cu), silver (Ag), palladium (Pd), a silver (Ag)-palladium (Pd) alloy, and/or gold (Au). However, from a viewpoint of cost reduction, Ni and Cu, which are non-precious metals, are preferable, and Ni is particularly preferable.

The inner electrode layer may include components other than the conductive metal. As such components, ceramic particles that define and function as a co-material can be included. By adding the co-material, shrinkage behavior of the inner electrode layer is matched with the dielectric layer in the firing step in the manufacturing of the multilayer ceramic capacitor, and as a result, the occurrence of defects such as peeling of the inner electrode layer can be reduced or prevented. As the ceramic particles, for example, dielectric particles of a $BaTiO_3$ based compound included in the dielectric layer, or the like are preferable. Further, a thickness of the inner electrode layer is, for example, preferably equal to or more than about 0.30 μm and equal to or less than about 0.40 μm, and more preferably equal to or more than about 0.30 μm and equal to or less than about 0.35 μm. By setting the thickness of the inner electrode to equal to or more than a predetermined value, it is possible to prevent the occurrence of problems such as electrode disconnection. Further, by setting to equal to or less than a predetermined value, a ratio occupied by the dielectric layer in the capacitor can be prevented from decreasing, which contributes to an increase in capacitance. Further, the number of inner electrode layers is preferably, for example, equal to or more than 10 and equal to or less than 1000.

Figure 7:
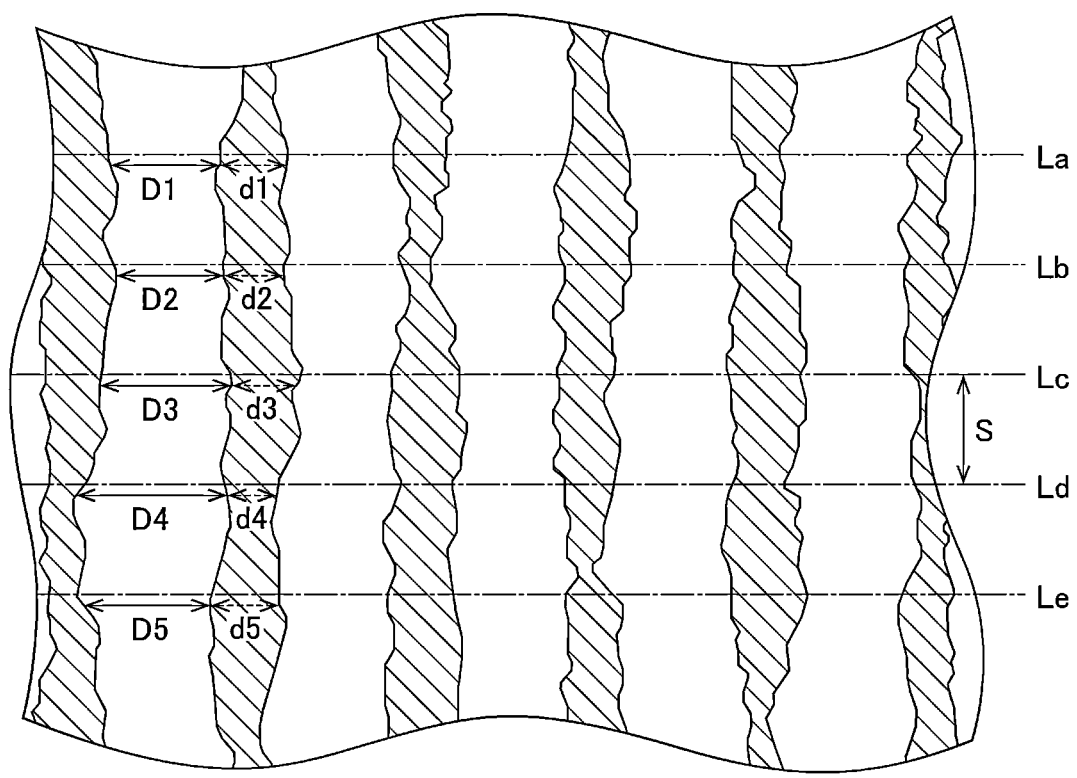
FIG. 7 is a drawing for explaining thickness measurement of an inner electrode layer and a dielectric layer.

The thickness of the inner electrode layer is measured, for example, as follows. First, an LT cross section passing through the center of the multilayer ceramic capacitor is polished to expose the inner layer portion. As appropriate, the exposed cross section may be subjected to etching treatment to remove a conductive layer extended by the polishing. FIG. 7 is an example of an enlarged image of the exposed cross section of the inner layer portion. In the illustrated enlarged image, for example, a plurality of straight lines La, Lb, Lc, Ld and Le extending in the lamination direction T at equal or substantially equal pitch intervals S is drawn. The pitch S is preferably as large as five to ten times a thickness of the inner electrode layer to be measured, and, for example, when an inner electrode layer of a thickness of about 1 μm is measured, the pitch S is set to about 5 μm.

Next, on the five straight lines La, Lb, Lc, Ld and Le, thicknesses da, db, dc, dd and de of the respective inner electrode layers are measured. However, when an inner electrode layer is lost and inner dielectric layers sandwiching the lost inner electrode layer are connected to each other on the straight lines La, Lb, Lc, Ld and Le, or when an enlarged diagram of a measurement position is unclear, new straight lines are drawn and thicknesses of inner electrode layers are measured. When the number of laminated inner electrode layers is less than five, thicknesses are measured for all of the inner electrode layers, and an average value thereof is taken as an average thickness of the plurality of inner electrode layers. A thickness of a dielectric layer can also be measured by a similar method to that for the inner electrode layer.

Preferably, in the cross section crossing the center in the length direction of the multilayer ceramic capacitor, a shift of an end portion position in the width direction of adjacent inner electrode layers is, for example, equal to or less than about 5 μm. That is, as for a pair of adjacent upper and lower inner electrode layers, it is preferable that positions of the end portions in the width direction are aligned.

Tin (Sn) may be present at an interface between a dielectric layer and an inner electrode layer. When Sn is present, Sn may be present in a form of a layer parallel or substantially parallel to the inner electrode layer, or may be scattered. Further, Sn may be dissolved in the inner electrode layer or may be present in the dielectric layer.

Outer Layer Portion

The outer layer portion (first outer layer portion, second outer layer portion) is made of a dielectric that is sandwiched between the first side margin portion and the second side margin portion, and is sandwiched between an inner electrode layer closest to the main surface (first main surface, second main surface) and the main surface, that is, the outer layer portions are provided at an upper portion and a lower portion of the inner layer portion. The outer layer portion is a region that includes dielectric ceramics and does not include an inner electrode layer therein. By providing the outer layer portion, the inner layer portion defining and functioning as a capacitance element can be protected from above and below.

The dielectric of the outer layer portion includes, for example, dielectric particles including barium (Ba) and titanium (Ti), and further includes, as sub-components, the rare earth elements (Re), and one or more of the first additional elements (Me) selected from manganese (Mn), vanadium (V), iron (Fe), copper (Cu), cobalt (Co), nickel (Ni) or chromium (Cr). That is, the dielectric layer includes the dielectric particles made of a $BaTiO_3$ based compound, and further includes the rare earth elements (Re) and the first additional elements (Me) as the sub-components. Further, the dielectric may include, for example, silicon (Si), magnesium (Mg), aluminum (Al) and/or a compound thereof as sub-components. Details of the $BaTiO_3$ based compound and the sub-components are as described for the inner layer portion.

A composition and a microstructure of the outer layer portion may be the same as or different from those of the dielectric layer included in the inner layer portion. When the composition of the outer layer portion is the same as that of the inner layer portion, it is sufficient to apply a dielectric green sheet used to form the inner layer portion in order to form the outer layer portion in the manufacturing of the multilayer ceramic capacitor.

Preferably, in the cross section crossing the center in the length direction of the multilayer ceramic capacitor, the dielectric of the outer layer portion (the first outer layer portion, the second outer layer portion) includes uniform solid solution particles as dielectric particles. Since the uniform solid solution particles are included in the outer layer portion, reliability can be further improved. Unlike core-shell particles, the uniform solid solution particles can be grain-grown without destroying an internal structure of the particle. Thus, the grain-growth can be sufficiently promoted in the firing step during the manufacturing of the multilayer ceramic capacitor, and as a result, densification of the dielectric of the outer layer portion can be achieved. When the densification of the outer layer portion is promoted, impurities such as moisture from an upper surface side can be prevented from entering, and thus, moisture resistance reliability is improved.

Details of the uniform solid solution particles included in the outer layer portion are as described for the inner layer portion. That is, for example, the uniform solid solution particles are dielectric particles having a Re concentration distribution ratio ((shell Re/Ti ratio)/(core Re/Ti ratio)) of less than about 1.5. More preferably, the dielectric of the outer layer portion mainly includes the uniform solid solution particles, and particularly preferably includes only the uniform solid solution particles. Further, for example, the RE concentration distribution ratio is preferably equal to or more than about 1.0 and less than about 1.5.

The dielectric particles included in the outer layer portion are observed as follows. First, the multilayer ceramic capacitor is processed to expose a WT plane thereof, and a thin sample piece is taken from a position of P2 illustrated in FIG. 6. Then, TEM observation is performed for the taken sample. It is sufficient to perform the processing and the TEM observation of the multilayer ceramic capacitor as in the case of the inner layer portion.

Side Margin Portion

The side margin portion (first side margin portion, second side margin portion) is made of a dielectric that extends along the side surface (first side surface, second side surface), and does not include an inner electrode layer, that is, the side margin portions are provided along the respective side surfaces of the multilayer ceramic capacitor so as to sandwich the inner layer portion and the outer layer portion. The side margin portion is also called a side gap. The side margin portion (side gap) is made of dielectric ceramics. By providing the side margin portion, it is possible to prevent impurities such as moisture from entering from a side of the side surface. The side margin portion may be a single layer or may be a multilayer body including a plurality of layers.

A dielectric of the side margin portion includes, for example, dielectric particles including barium (Ba) and titanium (Ti), and further including, as sub-components, the rare earth elements (Re) and one or more of the first additional elements (Me) selected from manganese (Mn), vanadium (V), iron (Fe), copper (Cu), cobalt (Co), nickel (Ni) or chromium (Cr). That is, the dielectric layer is made of a $BaTiO_3$ based compound, and further includes the rare earth elements (Re) and the first additional elements (Me) as the sub-components. Further, the dielectric may include silicon (Si), magnesium (Mg), aluminum (Al) and/or a compound thereof as sub-components. Details of the $BaTiO_3$ based compound and the sub-components are as described for the inner layer portion.

A composition and a microstructure of the side margin portion may be the same as or different from those of the dielectric layer included in the inner layer portion. The side margin portion may be integrally formed with the inner layer portion and the outer layer portion in the manufacturing of the multilayer ceramic capacitor. In this case, a composition and a microstructure of the dielectric layer of the side margin portion are continuous with the dielectric layer of the inner layer portion and/or the outer layer portion. On the other hand, the side margin portion may be formed separately from the inner layer portion and the outer layer portion, and specifically, only needs to be manufactured by attaching a side margin green body to a side surface of a laminated chip to be the inner layer portion and the outer layer portion to produce a green element body portion, and firing the green element body portion. In this case, a composition and/or a microstructure of the dielectric layer of the side margin portion are not continuous with the dielectric layer of the inner layer portion and/or the outer layer portion. Thus, a physical and chemical boundary exists between the side margin portion and the inner layer portion and/or the outer layer portion.

Preferably, in the cross section crossing the center in the length direction of the multilayer ceramic capacitor, the dielectric of the side margin portions (the first side margin portion and the second side margin portion) includes core-shell particles as dielectric particles. Reliability can be further improved since the core-shell particles are included in the side margin portion. That is, when an applied voltage is sufficiently high, electric field strength between inner electrode layers increases, and an electric field distribution spreads in the width direction, and as a result, the electric field is applied not only to the inner layer portion but also to the side margin portion. By providing the core-shell particles with a small particle size and having high reliability in the side margin portion, deterioration of insulation characteristics in the side margin portion is reduced or prevented, and as a result, the reliability of the multilayer ceramic capacitor as a whole is improved. In particular, in a region in the side margin portion near an interface with the inner layer portion, electric field strength is relatively high, and thus the dielectric particles in this region are preferably reduced in size.

Details of the core-shell particles included in the side margin portion are as described for the inner layer portion. That is, for example, the core-shell particles are dielectric particles having a Re concentration distribution ratio ((shell Re/Ti ratio)/(core Re/Ti ratio)) of equal to or more than about 1.5. More preferably, the dielectric of the side margin portion mainly includes the core-shell particles, and particularly preferably, includes only the core-shell particles. Further, for example, the Re concentration distribution ratio of the dielectric particle included in the dielectric may be equal to or more than about 1.0 and equal to or less than about 2.0, equal to or more than about 1.5 and equal to or less than about 2.0, or equal to or more than about 1.2 and equal to or less than about 1.8.

The dielectric particles included in the side margin portion are observed as follows. That is, the multilayer ceramic capacitor is processed to expose the WT plane thereof, and a thin sample piece is taken from a position of P3 illustrated in FIG. 6. Then, TEM observation is performed for the taken sample. It is sufficient to perform the processing and the TEM observation of the multilayer ceramic capacitor as in the case of the inner layer portion.

Outer Electrode

The outer electrode (first outer electrode, second outer electrode) defines and functions as an input/output terminal of the multilayer ceramic capacitor. A known configuration can be used as the outer electrode. For example, a base electrode layer, and a plating layer on the base electrode layer may be provided.

The base electrode layer includes at least one layer selected from layers such as a baked layer, a resin layer and a thin film layer. The baked layer is formed by applying a conductive paste including glass and metal to a multilayer body and then performing baking. The baking may be performed simultaneously with firing of the multilayer body, or may be performed after firing the multilayer body. The baked layer may be a single layer, or may include a plurality of layers. The metal included in the baked layer is preferably, for example, copper (Cu), nickel (Ni), silver (Ag), palladium (Pd), a silver (Ag)-palladium (Pd) alloy, and/or gold (Au). The resin layer includes conductive particles and thermosetting resin. The resin layer may be a single layer or may include a plurality of layers. The thin film layer is a layer that is formed by a thin film forming method such as, for example, a sputtering method or a vapor deposition method, in which metal particles are deposited, and that has a thickness of equal to or less than about 1 μm.

The plating layer includes metal such as, for example, copper (Cu), nickel (Ni), tin (Sn), silver (Ag), palladium (Pd), silver (Ag)-palladium (Pd), and/or gold (Au). The plating layer may be a single layer or may include a plurality of layers. A preferable plating layer has a two-layer structure including Ni plating and Sn plating, for example. The Ni plating layer can prevent a base layer from being eroded by solder when the multilayer ceramic capacitor is mounted. In addition, the Sn plating layer improves wettability of solder, thus has an advantageous effect of facilitating the mounting of the multilayer ceramic capacitor.

The outer electrode layer may include a plating layer without providing a base electrode layer. In this case, the plating layer is directly provided on the multilayer body, and is directly connected to the extended electrode portion of the inner electrode layer. However, a catalyst may be provided on the element body portion as a pretreatment. Preferably, the plating layer includes a first plating layer, and a second plating layer provided on the first plating layer. The first plating layer and the second plating layer include, for example, one of metals selected from copper (Cu), nickel (Ni), tin (Sn), lead (Pd), gold (Au), silver (Ag), palladium (Pd), bismuth (Bi) and zinc (Zn), or an alloy including the above metal. When the inner electrode layer includes Ni, the first plating layer preferably includes Cu having a good bonding property with Ni. Further, preferably, the first plating layer also includes Ni having good solder barrier performance. The second plating layer preferably includes Sn or Au having good solder wettability.

However, for example, the plating layer is not limited to one including a first plating layer and a second plating layer. A plating layer may include only a first plating layer without providing a second plating layer. Another plating layer may be provided on the second plating layer. In any case, the plating layer preferably does not include glass. Further, a metal ratio of the plating layer is preferably, for example, equal to or more than about 99% by volume. The plating layer is grain-grown along the thickness direction, and has a columnar shape.

2. Method for Manufacturing Multilayer Ceramic Capacitor

A method for manufacturing the multilayer ceramic capacitor of the present example embodiment is not limited as long as the above-described requirements are satisfied. However, an example of a method for manufacturing includes the following steps: preparing a main component raw material (preparing step), mixing the main component raw material with a sub-component raw material to obtain a dielectric raw material (mixing step), adding and mixing a binder and a solvent to the dielectric raw material to form a slurry, and forming a dielectric green sheet from the obtained slurry (forming step), printing a patterned paste layer on a surface of the dielectric green sheet using an inner electrode conductive paste (printing step), laminating and press-bonding a plurality of the dielectric green sheets to produce a laminated block (laminating step), cutting the obtained laminated block into laminated chips (cutting step), producing a side margin green body and then attaching the obtained side margin green body to a side surface of the laminated chip to produce a green element body portion (side margin portion forming step), subjecting the obtained green element body portion to a debinder treatment and a firing treatment to obtain an element body portion (firing step), and forming an outer electrode on the obtained element body portion to produce a multilayer ceramic capacitor (outer electrode forming step). The details of each step will be described below.

Preparation Step

In the preparation step, a main component raw material is prepared. The main component raw material is a main component of a dielectric layer included in an inner layer portion, and a dielectric forming an outer layer portion. As the main component raw material, $BaTiO_3$ based compound powder having a perovskite structure ($ABO_3$) can be used. It is sufficient to synthesize the $BaTiO_3$ based compound by a known method such as, for example, a solid-phase reaction method, a hydro-thermal synthesis method, an oxalic acid salt method, or an alkoxide method.

Preferably, first additional elements (Me) are added when the main component raw material is synthesized. This makes it possible to easily obtain dielectric particles in which the first additional elements are uniformly dissolved in the manufactured multilayer ceramic capacitor. For example, when $BaTiO_3$ including Mn is synthesized by the solid-phase reaction method, by adding a Mn source such as, for example, $Mn_3O_4$ to $BaCO_3$ and $TiO_2$, and calcining and crushing an obtained mixture, $BaTiO_3$ in which Mn is uniformly dissolved can be obtained.

Mixing Step

In the mixing step, the main component raw material is mixed with the remaining sub-component (Re and the like) raw materials to obtain a dielectric raw material. It is sufficient, as the sub-component raw materials, that known ceramic raw materials such as, for example, an oxide, a carbonate, a hydroxide, a nitrate, an organic acid salt, an alkoxide and/or a chelate compound are used. A mixing method is not particularly limited. For example, a method of mixing and pulverizing, in a wet manner, the main component raw material and the sub-component raw materials weighed together with a pulverization medium and pure water, using a ball mill, may be used. When the mixing is performed in a wet manner, it is sufficient to dry the mixture.

Forming Step

In the forming step, a binder and a solvent are added to and mixed with a dielectric raw material to form a slurry, and a dielectric green sheet is formed from the obtained slurry. The dielectric green sheet becomes a dielectric layer included in the inner layer portion of the multilayer ceramic capacitor or a dielectric forming the outer layer portion after firing. As the binder, it is sufficient to use a known organic binder such as, for example, a polyvinyl butyral based binder. Additionally, as the solvent, it is sufficient to use a known organic solvent such as, for example, toluene or ethanol. As appropriate, additives such as, for example, a plasticizer may be added. It is sufficient to perform the forming by a known method such as, for example, a RIP method. A thickness of the sheet after the forming is, for example, equal to or less than about 1 μm.

Printing Step

In the printing step, a patterned paste layer is formed on a surface of the dielectric green sheet using a conductive paste. The paste layer becomes an inner electrode layer after firing. As a conductive metal included in the conductive paste, it is sufficient to use conductive materials such as, for example, nickel (Ni), copper (Cu), silver (Ag), palladium (Pd) and an alloy including these conductive metals. However, nickel (Ni) is preferred. Further, ceramic particles as a co-material may be added to the conductive paste. As the ceramic particles, the main component raw material of the dielectric layer can be used. A method for forming the paste layer is not particularly limited. For example, a method such as screen printing or gravure printing may be used.

Laminating Step

In the laminating step, a plurality of the dielectric green sheets that are laminated and pressure-bonded is used to produce a laminated block. At this time, a plurality of the dielectric green sheets including the paste layers formed thereon are laminated so as to be sandwiched from above and below between the dielectric green sheets including no paste layers formed thereon. The green sheet including no paste layer formed thereon is subjected to the firing step to become an outer layer portion of the multilayer ceramic capacitor. On the other hand, the green sheet including the paste layer formed thereon becomes an inner layer portion of the multilayer ceramic capacitor. It is sufficient to adjust the number of green sheets to be laminated so as to obtain a required capacitance.

Cutting Step

In the cutting step, the obtained laminated block is cut into laminated chips. It is sufficient to perform the cutting so that a chip having a predetermined size is obtained and at least a portion of the paste layer is exposed at an end surface of the laminated chip.

Side Margin Portion Forming Step

In the side margin portion forming step, a side margin green body is produced, and then the obtained side margin green body is attached to the side surface of the laminated chip to form a green element body portion. The side margin green body becomes a side margin portion of the multilayer ceramic capacitor after firing. As a raw material of the side margin green body (side margin raw material), the main component raw material or the sub-component raw materials used to produce the dielectric layer of the inner layer portion can be used. However, a composition of the side margin portion is not necessarily the same as that of the inner layer portion, and may be a different composition.

It is sufficient to perform the production and attachment of the side margin green body by known methods. For example, a method of producing a green sheet from side margin raw material powder, and bonding the green sheet to the side surface of the laminated chip may be used. At that time, in order to reliably bond the green sheet, an adhesion auxiliary agent such as an organic solvent may be applied to the side surface of the laminated chip in advance. Alternatively, for example, a method of producing paste from the side margin raw material powder, applying the paste to the side surface of the laminated chip, and drying the paste may be used. Further, the side margin green body may be a single layer, or a multilayer body including a plurality of layers. The side margin green body formed of the multilayer body can be obtained by a method of laminating a plurality of the green sheets on the side surface of the laminated chip, or a method of repeating application and drying of the paste, for example. The paste layer exposed to the side surface of the laminated chip is covered with the side margin green body.

As appropriate, the green element body portion is subjected to barrel polishing treatment, for example. This treatment makes it possible to round corner portions and/or ridge portions of the element body portion.

Firing Step

In the firing step, the green element body portion is subjected to debinder treatment and firing treatment to produce an element body portion. The paste layer and the dielectric green sheet are co-sintered by the firing treatment to become an inner electrode layer and a dielectric layer, respectively. It is sufficient to determine conditions of the debinder treatment according to a type of the organic binder included in the green sheet and the paste layer. Further, it is sufficient to perform the firing treatment at a temperature at which the laminated chip is sufficiently densified, for example, the temperature is equal to or more than about 1200° C. and equal to or less than about 1300° C., and is held for equal to or more than 0 minutes and equal to or less than about 10 minutes. Further, the firing is performed in an atmosphere in which the $BaTiO_3$ based compound as the main component is not reduced, and oxidation of a conductive material is reduced or prevented, and for example, only needs to be performed in an $N_2$—$H_2$-$H_2O$ air flow having an oxygen partial pressure of about $1.8 \times 10^{-9}$ MPa to about $8.7 \times 10^{-10}$ MPa. Further, annealing treatment may be performed after the firing. In this way, the multilayer ceramic capacitor can be produced.

In the example of the method for manufacturing the present example embodiment, it is preferable to add a sub-component including one or more elements of silicon (Si), magnesium (Mg) and aluminum (Al) together with rare earth elements (Re) to the dielectric raw material to be the outer layer portion and the inner layer portion, and the side margin raw material to be the side margin portion. Here, Si works as a grain growth promoter, and Mg works as a grain growth inhibitor.

When grain growth of dielectric particles is promoted during the firing step, the particles grow while incorporating a surrounding sub-component element into a surface layer. Thus, uniform solid solution particles tend to be formed. On the other hand, when the grain growth is inhibited, the incorporation of the sub-component element is inhibited, and thus core-shell particles are easily formed. Thus, by adding Si and/or Mg having the effect of promoting and inhibiting the grain growth, and adjusting an amount of addition thereof, respective ratios of the core-shell particles and the uniform solid solution particles in the inner layer, the outer layer, and the first side margin portion can be controlled.

In particular, for example, it is preferable that the dielectric raw material to be the outer layer portion includes a large amount of Si. This promotes the grain growth in the outer layer portion, and allows the outer layer portion to include a large amount of the uniform solid solution particles. In addition, since Si diffuses from the outer layer portion to the inner layer portion during firing, a ratio of the uniform solid solution particles increases in a region of the inner layer portion near an interface with the outer layer portion. On the other hand, in the dielectric raw material to be the side margin portion, for example, it is preferable to reduce an amount of Si and to blend a large amount of Mg. This makes it possible to inhibit the grain growth in the side margin portion and increase a ratio of core-shell particles.

Outer Electrode Forming Step

In the outer electrode forming step, an outer electrode is formed on the element body portion to form a multilayer ceramic capacitor. It is sufficient to form the outer electrode by a known method. For example, a conductive paste including a conductive component such as Cu or Ni as a main component is applied to an end surface of the element body portion from which the inner electrode is extended and exposed, and is baked to form a base layer. The base layer may be formed, for example, by a method of applying the conductive paste to both end surfaces of the green element body portion before firing and then performing firing treatment. After the base layer is formed, it is sufficient to form a plating film of, for example, Ni, Sn, or the like on a surface of the base layer by applying electrolytic plating. Thus, a multilayer ceramic capacitor is produced.

EXAMPLES

The present example embodiment will be described more specifically by way of the following examples. However, the present invention is not limited to the following examples.

(1) Production of Multilayer Ceramic Capacitor

Examples 1 to 12 and Comparative Examples 1 to 5

A multilayer ceramic capacitor including a $BaTiO_3$ based compound as a main component of an inner layer portion, an outer layer portion and a side margin portion was produced and evaluated. As sub-components, dysprosium (Dy) as a rare earth element (Re), and manganese (Mn), vanadium (V) and nickel (Ni) as first additional elements (Me) were used, and silicon (Si), magnesium (Mg) and aluminum (Al) were further used.

Preparation Step

As main component raw material powder, $BaCO_3$, $TiO_2$ and NiO were mixed and subjected to heat treatment to prepare Ni dissolved $BaTiO_3$ powder. A particle size of the obtained powder was about 100 nm to about 150 nm.

In addition to the main component raw material, sub-component raw materials other than nickel (Ni) were prepared. As the sub-component raw materials, compounds of dysprosium (Dy), silicon (Si), magnesium (Mg), manganese (Mn), aluminum (Al) and vanadium (V) were used. In addition, blended amounts of the main component raw material and the sub-component materials were adjusted so that an amount of Si of a dielectric layer included in the outer layer portion was more than an amount of Si of the dielectric layer included in the inner layer portion in the manufactured multilayer ceramic capacitor.

Next, the sub-component raw materials were added to the main component raw material, and the raw materials were mixed in a wet manner using a ball mill and then dried to obtain a dielectric raw material. A polyvinyl butyral based binder and ethanol being an organic solvent were added to the obtained dielectric raw material, and mixing in a wet manner was performed using a ball mill for a predetermined time to produce a slurry. The slurry was formed into a sheet to produce a dielectric green sheet.

Next, a conductive paste mainly including Ni was screen-printed on a surface of the obtained dielectric green sheet to form a pattern of a paste layer to be an inner electrode layer. Thereafter, a plurality of laminated green sheets having the paste layers formed thereon were used, and green sheets having no paste layer formed thereon were arranged above and below the laminated green sheets, and an entirety thereof was pressure-bonded to produce a laminated block. Then, the obtained laminated block was cut into laminated chips by a dicing saw. The lamination was performed so that end portions from which the paste layers extended were alternately arranged. Further, the cutting was performed so that the paste layer was exposed on a side surface.

Separately from the laminated chip, a green sheet for a side margin portion was produced, and this was used as a side margin green body. The production of the green sheet for the side margin portion was performed in the same or similar manner to that for the dielectric green sheet except that blended amounts of a main component raw material and sub-component raw materials were changed. At this time, the blended amounts were adjusted such that an amount of Si of the dielectric included in the side margin portion was larger than an amount of Si of the dielectric contained in the inner layer portion, and an amount of Mg of the dielectric included in the side margin portion was larger than an amount of Mg of the dielectric included in the inner layer portion in the manufactured multilayer ceramic capacitor. Next, the green sheets for the side margin portions were bonded to both the side surfaces of the cut laminated chip where the paste layers were exposed, to produce a green element body portion.

The obtained green element body portion was subjected to heat treatment in an $N_2$ air flow under a condition of a maximum temperature of about 270° C., and further subjected to heat treatment in an $N_2$—$H_2O$—$H_2$ air flow under a condition of a maximum temperature of about 800° C. Thereafter, firing was performed in an $N_2$—$H_2O$—$H_2$ air flow with an oxygen partial pressure of about $1.8 \times 10^{-9}$ MPa to about $8.7 \times 10^{-10}$ MPa. In the firing, cooling to near room temperature was performed immediately after the maximum temperature is reached. Subsequently, heat treatment was performed in an $N_2$—$H_2O$—$H_2$ air flow under conditions: an oxygen partial pressure of about $2.3 \times 10^{-12}$ MPa to about $1.5 \times 10^{-11}$ MPa, and a temperature lower than the maximum temperature. Thus, an element body portion of a multilayer ceramic capacitor was obtained.

A conductive paste including copper (Cu) as a main component was applied to an end surface of the element body portion obtained by the firing, from which an inner electrode layer extended. Thereafter, the applied conductive paste was baked at about 900° C. to form a base layer of an outer electrode. Further, Ni plating and Sn plating were performed in this order on a surface layer of the base layer by wet plating. In this way, a multilayer ceramic capacitor was produced.

The produced multilayer ceramic capacitor had a length L dimension of about 1.0 mm, a width direction W dimension of about 0.5 mm and a thickness direction T dimension of about 0.2 mm. In addition, in the inner layer portion, a thickness of the dielectric layer was about 0.48 µm, a thickness of the inner electrode layer was about 0.38 µm and the number of dielectric layers was 50.

(2) Evaluation

The produced multilayer ceramic capacitor was evaluated for various characteristics as follows.

SEM Observation

A WT plane of the multilayer ceramic capacitor was observed using a scanning electron microscope (SEM) to examine the thicknesses of the dielectric layer and the inner electrode layer. Specifically, the multilayer ceramic capacitor was polished to a center in a length (L) direction to expose a cross section (WT plane). Next, in the exposed cross section, thicknesses of the inner electrode layers of the inner layer portion located near a center in the thickness direction were measured on a total of five lines including a center line in the width direction W, and two lines on each of both sides drawn at equal or substantially equal intervals from the center line in the width direction W, and an average value of the thicknesses was taken as a thickness of the inner electrode layer. A thickness of the dielectric layer was similarly determined.

TEM Observation

The cross section (WT plane) of the multilayer ceramic capacitor was observed using a transmission electron microscope (TEM) to examine dielectric particles included in the inner layer portion, the outer layer portion and the side margin portion. Specifically, the multilayer ceramic capacitor was polished to the center in the length (L) direction to expose the WT plane, and further processed to take thin sample pieces having the WT plane as an observation plane. The thin sample pieces were taken from the positions P1, P2 and P3 illustrated in FIG. 6, and were used as an inner layer portion sample, an outer layer portion sample and a side margin portion sample. The observation was performed in a field of view of about 1000 nm×about 1000 nm.

Then, for each sample, an elemental analysis was performed using a TEM-EDX for each dielectric particle in the field of view. The elemental analysis was performed on each of a central portion of each particle and a portion inward from a particle outer surface by a distance of about 10 nm (particle outer peripheral portion). However, a particle having a shape distorted to such an extent that a central portion cannot be determined is excluded from the analysis. Then, concentration of rare earth elements (Re) and titanium (Ti) were examined for each of a particle peripheral portion and a particle central portion of each particle, and a Re concentration distribution ratio ((shell Re/Ti ratio)/(core Re/Ti ratio)) was determined. Then, a particle having a Re concentration distribution ratio of equal to or more than about 1.5 was determined as a core-shell particle, and a particle having a Re concentration distribution ratio of less than about 1.5 was determined as a uniform solid solution particle.

In addition, areas of the respective core-shell particles in a cross section of the inner layer portion were measured, and a total area of the core-shell particles was obtained by adding the areas. Thereafter, the total area was divided by the number of core-shell particles to calculate an average area (A). Similarly, an average area (B) was calculated by dividing a total area of the uniform solid solution particles by the number of uniform solid solution particles. Then, the average area (A) of the core-shell particles was divided by the average area (B) of the uniform solid solution particles to determine an area ratio (A/B).

Further, in the cross section of the inner layer portion, a TEM cross-sectional image was captured in a field of view of about 1000 nm×about 1000 nm, and then each side was divided into 255 parts, and the field of view was divided into a plurality of cells in a matrix. Next, concentration of first additional elements was measured for each dielectric particle in each cell, and an average value and a variation (standard deviation) were obtained. Then, division of the variation by the average value was calculated as a coefficient of variation of the first additional elements (Me).

Relative Dielectric Constant

Electrostatic capacitance of the dielectric layer was measured at room temperature using an automatic bridge measuring machine. The measurement was performed under an effective voltage of about 0.5 V and a frequency of about 1 kHz. From the obtained electrostatic capacitance, a relative dielectric constant ($\varepsilon_r$) was calculated using the thickness of the dielectric layer and an area of a counter electrode, and an average value thereof was determined. Then, the samples were rated according to the following criteria based on the obtained values of the relative dielectric constant.

A: Relative dielectric constant equal to or more than about 3500 and less than about 4000

B: Relative dielectric constant equal to or more than about 3300 and less than about 3500, or equal to or more than about 4000 and less than about 4500

C: Relative dielectric constant less than about 3300, or equal to or more than about 4500

Insulation Resistance

Using an insulating resistance meter, a voltage of about 4V was preliminarily applied to the multilayer ceramic capacitor at room temperature for about 60 seconds, and then an initial value of insulation resistance (IR) was measured. Then, a common logarithm of the insulation resistance (Log IR) was determined. Based on the values obtained, the samples were rated according to the following criteria.

A: Log IR equal to or more than about 8 and less than about 9

B: Log IR equal to or more than about 7 and less than about 8

C: Log IR less than about 7

Reliability

For ten samples, a high temperature loading test (HALT) was performed under a temperature of about 150° C., and an applied voltage of about 5V. The insulation resistance (IR) decreased with time. A time until Log IR was equal to or less than about 4 for five samples out of the ten samples was measured as a mean time to failure (MTTF), and this was used as an index of high temperature load life. Based on the values obtained, the samples were rated according to the following criteria.
- A: MTTF equal to or more than about 80 hours
- B: MTTF equal to or more than about 60 hours and less than about 80 hours
- C: MTTF less than about 60 hours (3) Evaluation Result Obtained results of the evaluation of Examples 1 to 12 and Comparative Examples 1 to 5 are collectively shown in Table 1.

In any of Examples 1 to 12 in which the coefficient of variation of ME and the area ratio (A/B) in the inner layer portion satisfy the ranges specified in the present example embodiment, the insulation resistance (IR) and the relative dielectric constant ($\varepsilon_r$) were high, and the high temperature load life (MTTF) was long. In particular, Examples 3 and 10 to 12 were markedly excellent in all of the insulation resistance, the relative dielectric constant, and the high temperature load life.

On the other hand, Comparative Examples 1, 2, 4, and 5, in which the coefficient of variation of ME did not satisfy the range specified in the present example embodiment, were particularly insufficient in the insulation resistance. In addition, in Comparative Examples 2 to 5 in which the area ratio (A/B) did not satisfy the range specified in the present example embodiment, one of the insulation resistance, the relative dielectric constant, and the high temperature load life was insufficient.

TABLE 1

Results of evaluation of multilayer ceramic capacitor

| | Inner layer portion | | Side margin portion Re | Outer layer portion Re | | Relative | High |
| --- | --- | --- | --- | --- | --- | --- | --- |
| | Coefficient of variation of Me (%) | A/B | concentration distribution ratio | concentration distribution ratio | Insulation resistance LogIR | dielectric constant $\varepsilon_r$ | temperature load life MTTF |
| Example 1 | 8 | 1.3 | 1.0 | 2.0 | B | B | B |
| Example 2 | 10 | 1.5 | 1.3 | 1.7 | B | B | B |
| Example 3 | 8 | 1.5 | 1.5 | 1.4 | A | A | A |
| Example 4 | 12 | 1.2 | 1.0 | 1.0 | B | A | B |
| Example 5 | 16 | 0.9 | 1.3 | 1.3 | B | A | B |
| Example 6 | 18 | 1.3 | 1.1 | 1.1 | B | A | B |
| Example 7 | 12 | 1.0 | 2.0 | 1.7 | A | B | A |
| Example 8 | 15 | 1.5 | 1.7 | 1.8 | A | B | A |
| Example 9 | 12 | 0.8 | 1.6 | 1.7 | A | B | A |
| Example 10 | 11 | 0.9 | 2.0 | 1.0 | A | A | A |
| Example 11 | 16 | 1.2 | 1.8 | 1.1 | A | A | A |
| Example 12 | 20 | 1.5 | 1.6 | 1.2 | A | A | A |
| Comparative example 1 | 21 | 1.5 | 1.5 | 1.3 | C | B | B |
| Comparative example 2 | 25 | 2.3 | 1.7 | 1.1 | C | B | B |
| Comparative example 3 | 18 | 0.4 | 1.8 | 1.4 | B | C | C |
| Comparative example 4 | 25 | 2.0 | 1.6 | 1.2 | C | C | C |
| Comparative example 5 | 28 | 0.3 | 2.0 | 1.1 | C | C | C |

Note 1:

coefficient of variation of Me indicates coefficient of variation representing inter-particle variations in first additional element concentration in uniform solid solution particles.

Note 2:

A/B indicates ratio of average area A occupied by core-shell particles to average area B occupied by uniform solid solution particles.

Note 3:

Re concentration distribution ratio indicates ratio of shell Re/Ti ratio to core Re/Ti ratio.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
an element body portion including a first main surface and a second main surface opposite to each other in a thickness direction, a first side surface and a second side surface opposite to each other in a width direction, and a first end surface and a second end surface opposite to each other in a length direction, the element body portion including a plurality of dielectric layers and a plurality of inner electrode layers alternately laminated in the thickness direction; and
a pair of outer electrodes on the first end surface and the second end surface and connected to the plurality of inner electrode layers; wherein
the element body portion includes:
a first side margin portion extending along the first side surface, made of a dielectric, and that does not include the inner electrode layers;
a second side margin portion extending along the second side surface, made of the dielectric, and that does not include the inner electrode layers;
a first outer layer portion made of the dielectric, sandwiched between the first side margin portion and the second side margin portion, and sandwiched between the first main surface and an inner electrode layer closest to the first main surface among the plurality of inner electrode layers;
a second outer layer portion made of the dielectric, sandwiched between the first side margin portion and the second side margin portion, and sandwiched between the second main surface and an inner electrode layer closest to the second main surface among the plurality of inner electrode layers; and
an inner layer portion sandwiched between the first side margin portion and the second side margin portion, sandwiched between the first outer layer portion and the second outer layer portion, and defined by a multilayer body including the plurality of dielectric layers and the plurality of inner electrode layers;
the dielectric of the first side margin portion, the second side margin portion, the first outer layer portion, and the second outer layer portion, and the plurality of dielectric layers included in the inner layer portion each include dielectric particles including barium and titanium as a main component, and, as sub-components, rare earth elements, and one or more first additional elements selected from manganese, vanadium, iron, copper, cobalt, nickel, or chromium; and
in a cross section crossing a center in the length direction of the multilayer ceramic capacitor, the dielectric layers included in the inner layer portion include, as the dielectric particles, both core-shell particles and uniform solid solution particles, a ratio (A/B) of an average area (A) occupied by the core-shell particles to an average area (B) occupied by the uniform solid solution particles is equal to or more than about 0.8 and equal to or less than about 1.5, and a coefficient of variation representing inter-particle variations of first additional element concentration included in the uniform solid solution particles is equal to or less than about 20%.

2. The multilayer ceramic capacitor according to claim 1, wherein, in the cross section, the dielectric of the first outer layer portion and the second outer layer portion includes the uniform solid solution particles as the dielectric particles.

3. The multilayer ceramic capacitor according to claim 1, wherein, in the cross section, the dielectric of the first side margin portion and the second side margin portion includes the core-shell particles as the dielectric particles.

4. The multilayer ceramic capacitor according to claim 1, wherein the rare earth elements include dysprosium.

5. The multilayer ceramic capacitor according to claim 1, wherein, in the cross section, a shift of an end position in the width direction of the inner electrode layers adjacent to each other is equal to or less than about 5 μm.

6. The multilayer ceramic capacitor according to claim 1, wherein a thickness of each of the plurality of dielectric layers is equal to or more than about 0.40 μm and equal to or less than about 0.50 μm.

7. The multilayer ceramic capacitor according to claim 1, wherein a thickness of each of the plurality of dielectric layers is equal to or more than about 0.40 μm and equal to or less than about 0.45 μm.

8. The multilayer ceramic capacitor according to claim 1, wherein a thickness of each of the plurality of inner electrode layers is equal to or more than about 0.30 μm and equal to or less than about 0.40 μm.

9. The multilayer ceramic capacitor according to claim 1, wherein a thickness of each of the plurality of inner electrode layers is equal to or more than about 0.30 μm and equal to or less than about 0.35 μm.

10. The multilayer ceramic capacitor according to claim 1, wherein the plurality of inner electrode layers include first inner electrode layers and the second inner electrode layers with rectangular or substantially rectangular opposing electrode portions opposite to each other and extended electrode portions extending to respective ones of the first end surface and the second end surface to be connected to the pair of outer electrodes.

11. The multilayer ceramic capacitor according to claim 1, wherein the multilayer ceramic capacitor has a rectangular or substantially rectangular shape.

12. The multilayer ceramic capacitor according to claim 1, wherein the multilayer ceramic capacitor has a dimension in the length direction of equal to or more than about 0.2 mm and equal to or less than about 3.2 mm, a dimension in the width direction of equal to or more than about 0.1 mm and equal to or less than about 2.5 mm, and a dimension in the thickness direction of equal to or more than about 0.1 mm and equal to or less than about 2.5 mm.

13. The multilayer ceramic capacitor according to claim 1, wherein the main component of the dielectric particles is $BaToO_3$.

14. The multilayer ceramic capacitor according to claim 1, wherein the rare earth element includes one or more of lanthanum, cerium, praseodymium, neodymium, samarium, europium, gadolinium, terbium, dysprosium, holmium, erbium, thulium, ytterbium, or lutetium.

15. The multilayer ceramic capacitor according to claim 1, wherein the first additional elements include nickel.

16. The multilayer ceramic capacitor according to claim 1, wherein an average particle size of the core-shell particles is equal to or more than about 100 nm and equal to or less than about 150 nm.

17. The multilayer ceramic capacitor according to claim 1, wherein an average particle size of the uniform solid solution particles is equal to or more than about 150 nm and equal to or less than about 400 nm.

18. The multilayer ceramic capacitor according to claim 1, wherein each of the plurality of inner electrode layers includes at least one of nickel, copper, silver, palladium, a silver-palladium alloy, or gold.

19. The multilayer ceramic capacitor according to claim 1, wherein a number of the plurality of inner electrode layers is equal to or more than 10 and equal to or less than 1000.

20. The multilayer ceramic capacitor according to claim 1, wherein each of the pair of outer electrodes includes a base electrode layer and a plating layer on the base electrode layer.

* * * * *